United States Patent
Gonzalez Juanes et al.

(10) Patent No.: US 10,639,951 B2
(45) Date of Patent: May 5, 2020

(54) ELECTRICAL SOCKET

(71) Applicant: ENGANCHES Y REMOLQUES ARAGÓN, S.L., Saragossa (ES)

(72) Inventors: Ramiro Gonzalez Juanes, Saragossa (ES); Fernando Benito Monreal, Saragossa (ES); Nelson Benito Monreal, Saragossa (ES); Alejandro Rios Nerin, Saragossa (ES); Raul Perfecto Carcelero, Saragossa (ES)

(73) Assignee: ENGANCHES Y REMOLQUES ARAGON, S.L., Saragossa (ES)

( * ) Notice: Subject to any disclaimer, the term of this patent is extended or adjusted under 35 U.S.C. 154(b) by 0 days.

(21) Appl. No.: 16/321,935

(22) PCT Filed: Feb. 20, 2018

(86) PCT No.: PCT/EP2018/054114
§ 371 (c)(1),
(2) Date: Jan. 30, 2019

(87) PCT Pub. No.: WO2018/153843
PCT Pub. Date: Aug. 30, 2018

(65) Prior Publication Data
US 2019/0160900 A1    May 30, 2019

(30) Foreign Application Priority Data
Feb. 21, 2017 (EP) .................... 17382086

(51) Int. Cl.
*B60D 1/64* (2006.01)
*H01R 13/66* (2006.01)
*H01R 13/52* (2006.01)

(52) U.S. Cl.
CPC ........... *B60D 1/64* (2013.01); *H01R 13/6625* (2013.01); *H01R 13/6683* (2013.01);
(Continued)

(58) Field of Classification Search
None
See application file for complete search history.

(56) References Cited

U.S. PATENT DOCUMENTS 6,642,628 B2 * 11/2003 Burdick .................. B60D 1/62
307/10.1
6,749,438 B1 * 6/2004 Scheller .................. B60D 1/62
439/35

(Continued)

FOREIGN PATENT DOCUMENTS

EP        1 351 340 A1    10/2003
WO    WO 2012/058732 A1    5/2012

OTHER PUBLICATIONS

International Search Report and Written Opinion dated Jun. 7, 2018 for International Patent Application No. PCT/EP2018/054114, 11 pages.

*Primary Examiner* — Truc T Nguyen
(74) *Attorney, Agent, or Firm* — Squire Patton Boggs (US) LLP

(57) ABSTRACT

An electrical socket for connecting an electrical installation of a towing vehicle with an electrical installation of a trailer is provided. The electrical socket comprises a plurality of electrical connectors and a plurality of holes for receiving pins from an electrical plug to connect to the electrical connectors. The socket further comprises one or more light sources, a proximity sensor and a control unit for and a control unit for activating the light sources in response to the proximity sensor detecting a presence of a user at a distance around the socket below a predetermined threshold distance. An electrical kit for connecting an electrical installation of a towing vehicle with an electrical installation of a trailer comprising such an electrical socket is also disclosed.

20 Claims, 3 Drawing Sheets

(52) U.S. Cl.
CPC ..... *H01R 13/6691* (2013.01); *H01R 13/5213* (2013.01); *H01R 2201/26* (2013.01)

(56) References Cited

U.S. PATENT DOCUMENTS

| | | | | |
|---|---|---|---|---|
| 7,291,032 | B1* | 11/2007 | Carver | H01R 43/26 |
| | | | | 439/310 |
| 10,059,161 | B1* | 8/2018 | Salter | B60D 1/36 |
| 2008/0280460 | A1* | 11/2008 | Fudala | B60D 1/64 |
| | | | | 439/35 |
| 2009/0311881 | A1* | 12/2009 | Dilgard | H01R 31/02 |
| | | | | 439/35 |
| 2010/0029097 | A1* | 2/2010 | Burlak | B60D 1/62 |
| | | | | 439/35 |
| 2011/0053385 | A1* | 3/2011 | Smith | A01B 59/00 |
| | | | | 439/35 |
| 2013/0257145 | A1* | 10/2013 | Caldeira | B60L 58/21 |
| | | | | 307/9.1 |
| 2014/0295684 | A1* | 10/2014 | Gette | H01R 13/447 |
| | | | | 439/137 |
| 2015/0064936 | A1* | 3/2015 | Bartoli | H01R 13/502 |
| | | | | 439/35 |
| 2016/0347213 | A1 | 12/2016 | Pretta et al. | |
| 2017/0217317 | A1* | 8/2017 | Khusravsho | B60K 1/04 |
| 2018/0358760 | A1* | 12/2018 | AbuGhazaleh | H01R 13/6683 |
| 2019/0111899 | A1* | 4/2019 | Lange, III | H01R 13/665 |

* cited by examiner

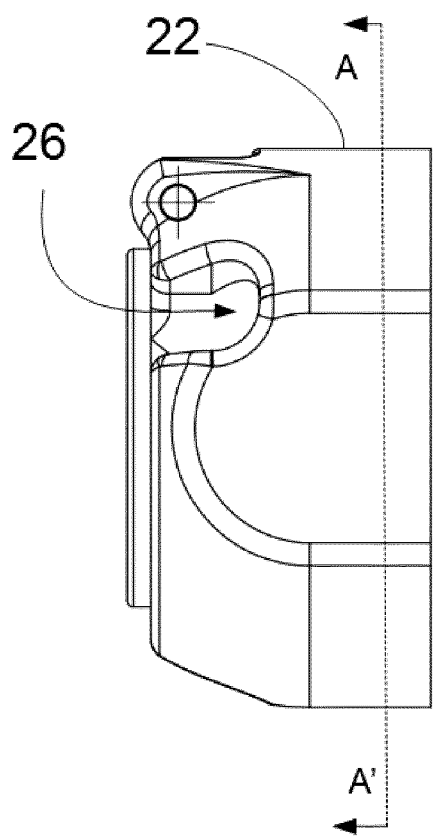
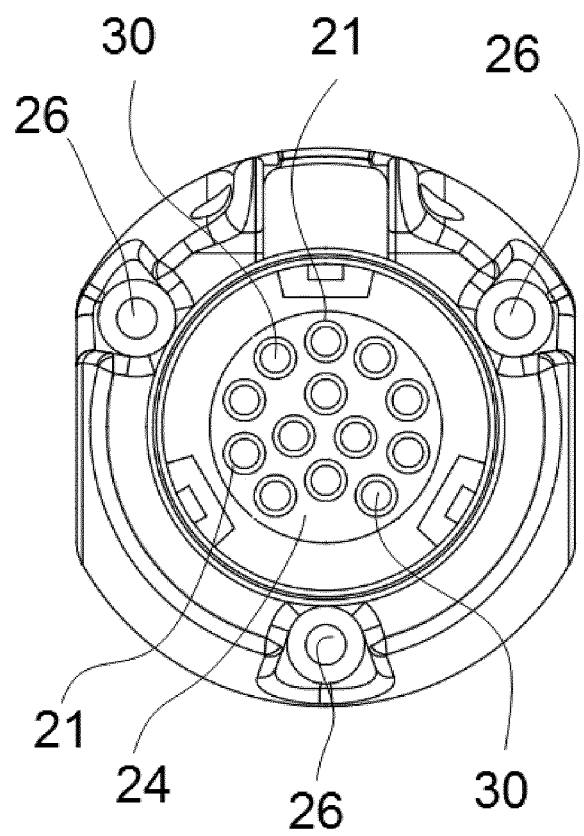
Figure 2
Figure 3

ELECTRICAL SOCKET

The present application claims the benefit and priority of EP 17 382 086.1 filed on Feb. 21, 2017.

The present disclosure relates to an electrical socket for connecting an electrical installation of a towing vehicle with an electrical installation of a trailer, and further relates to an electrical kit for electrically connecting an electrical installation of a towing vehicle and an electrical installation of a trailer.

BACKGROUND

Tow bars or tow hitches are devices commonly used for connecting a towing vehicle or a tractor vehicle to a trailer. The trailer may thus be pulled by the towing vehicle. Tow hitches may be mounted on the rear part of towing vehicles, e.g. in the area of the rear bumper of a car or a truck, for hooking a trailer. Trailers may be for example caravans, boat trailers or box trailers.

Tow hitches generally have the form of a tow ball which allows inserting a tow ring attached to the trailer and thus establishing a mechanical connection between the towing vehicle and the trailer.

Tow hitches frequently also comprise or can be combined with a socket for electrically connecting the electrical system of the towing vehicle to the electrical system of the trailer. This electrical connection allows the transmission of electrical signals between the towing vehicle and the trailer. Such electrical sockets comprise electrical connectors connected to electrical cables which in turn are connected the electrical system of the vehicle. These electrical connectors may be mounted inside the socket and serve to electrically connect to a plug associated with the trailer. Known electrical connections are formed by e.g. a 7-pin or 13-pin socket in combination with a 7-pin or 13-pin plug of the trailer. Such an electrical connection may supply power from the towing vehicle to the trailer for activating operating lights or other indicators as for example left/right indicators, positioning lights or fog lights.

Such electrical sockets are typically mounted under the rear bumper or integrated in the rear part of a vehicle and therefore they are often not easily visible. It is especially difficult to see the electrical socket in the dark or with a poor illumination. Identifying the location of the socket can therefore be done by touching or by using a flashlight. Then, the user has to kneel down and touch the rear part of the vehicle or holding a flashlight or a torch with one hand, which makes it difficult to connect the plug of the trailer to the socket of the towing vehicle. Furthermore, the electrical contacts are not interchangeable, i.e. each pin of the plug has to be connected to the corresponding pin of the socket. The correct orientation of the plug with the socket thus needs to be found. As a result, users often must spend considerable time in a non-comfortable position trying to find the location of the socket and correctly orienting the plug and the socket.

The present disclosure provides examples of systems and methods that at least partially resolve some of the aforementioned disadvantages.

SUMMARY

In a first aspect, an electrical socket for connecting an electrical installation of a towing vehicle with an electrical installation of a trailer is provided. The electrical socket comprises a plurality of electrical connectors and a plurality of holes for receiving pins from an electrical plug to connect to the electrical connectors. The socket further comprises one or more light sources, a proximity sensor and a control unit for activating the light sources in response to the proximity sensor detecting a presence of a user at a distance around the socket below a predetermined threshold distance.

In this aspect, when the user approaches the socket e.g. with his or her hand, the proximity sensor detects its presence and the control unit activates the one or more light sources, i.e. switches on the one or more light sources. Therefore, the location of the socket is visible and identifiable. Switching on the light source also helps the user to manipulate the socket for properly connecting the plug to the socket.

Proximity sensors are sometimes also called as motion or movement sensors, since they are able to detect a particular movement. The proximity sensor may detect a movement or a position of the user, for example a hand or arm wave, in close proximity to the socket.

The predetermined threshold distance may be selected as a distance which allows the user to make the socket illuminate and avoid that the user has to kneel down and remain in a non-comfortable position. This predetermined threshold distance may be for example of between 0 mm to 10 mm. In this aspect, when the user or rather a hand (or arm or a foot) of the user is at a distance below of such a predetermined threshold distance, the light source is activated, while if the user's hand is further away from such a threshold distance, the light source is not activated, i.e. it remains switched off.

In some examples, the socket may be configured to be attached to a towing vehicle directly or through a bracket. The socket may be attached to the towing vehicle by one or more fasteners, for example threaded fasteners such as bolts or screws. In this way, the socket may comprise at least one hole adapted to receive one fastener for attaching or screwing the socket to the towing vehicle. In some examples, such a hole may be a threaded hole. Other connecting methods like riveting, clinching, bonding or clamping may also be used.

In some examples, the one or more light sources and/or the proximity sensor may be arranged inside a housing of the socket. In this aspect, the light source and/or the proximity sensor may be isolated from the exterior and thus the environmental factors do not affect the operation of the light source and/or the proximity sensor.

In some examples, the light source may be a light-emitting diode (LED). In this way, longer life time and energy efficiency may be achieved as compared to traditional incandescent light bulbs. In addition, a LED may be connected to a low-voltage power supply.

In some examples, the proximity sensor may be a capacitive sensor. A capacitive sensor may detect the approach of an object by the change of the capacitance sensed by such a capacitive sensor. Since the detection of an object depends on the capacitance resistance of the approaching object, the capacitive sensor may determine which object is approaching. The capacitive sensor may thus be configured to detect the user, for example a hand or a foot of user, and not to detect other objects as for example bumps of a pavement or a front bumper of another vehicle. Therefore, the sensitivity and accuracy of the sensor can be increased.

Alternatively, the proximity sensor may be an inductive sensor.

In some examples, the capacitive sensor may comprise a capacitive antenna or a capacitive electrode. Such a capacitive antenna or electrode may detect an object in front of it and react to the approximation of the object by changing the capacitance of a capacitor formed by the electrode or antenna and the object. In some examples, the antenna may be arranged along a perimeter of the socket. In some examples, the antenna may be arranged along a perimeter of an inside of the socket. In these examples, the detection may be enhanced since the antenna is placed as close as possible to the object to be detected, while it is protected by a housing of the socket. Alternatively, the antenna may be placed along of a perimeter of an outside of the socket.

In some examples, the antenna may be placed along a whole perimeter of the socket. Alternatively, the antenna may be placed only along at portion of a perimeter. In further examples, the antenna may be mounted on other parts of the socket, such as e.g. on a lid that closes off a housing.

In some examples the control unit may be a printed circuit board (PCB). In addition, the antenna may be mounted embedded on the printed circuit board. The printed circuit board provides robustness and compactness to the antenna since the antenna is fixed. In this way, this also prevents that the antenna can release from the mounting position and therefore sensing errors or disturbances are also minimized. Integrating the antenna in the printed circuit board further increases the protection against external factors as for example climate conditions.

In a further aspect, an electrical kit for connecting an electrical installation of a towing vehicle with an electrical installation of a trailer comprising an electrical socket according to any of the examples herein described is also provided. The kit may further comprise an electrical plug configured to be connected to the electrical socket and a first and a second electrical wiring. The first electrical wiring may be configured to connect an electrical system of a towing vehicle to the electrical socket, while the second electrical wiring may be configured to connect an electrical system of a trailer to the electrical plug.

In some examples, the electrical kit may further comprise at least one fastener, for example a threaded fastener, configured to be inserted into at least one hole of the socket for attaching the socket to a towing vehicle or to a bracket attached to the vehicle. In addition, the electrical kit may further comprise a socket bracket for attaching the socket to the vehicle. Furthermore, the electrical kit may comprise a plug bracket for attaching the plug to the trailer.

BRIEF DESCRIPTION OF THE DRAWINGS

Non-limiting examples of the present disclosure will be described in the following, with reference to the appended drawings, in which:

FIG. 2 shows a lateral view of an example of an electrical socket;

FIG. 3 shows a frontal view of the socket of the FIG. 2;

DETAILED DESCRIPTION OF EXAMPLES

In these figures the same reference signs have been used to designate matching elements.

Figure 1:
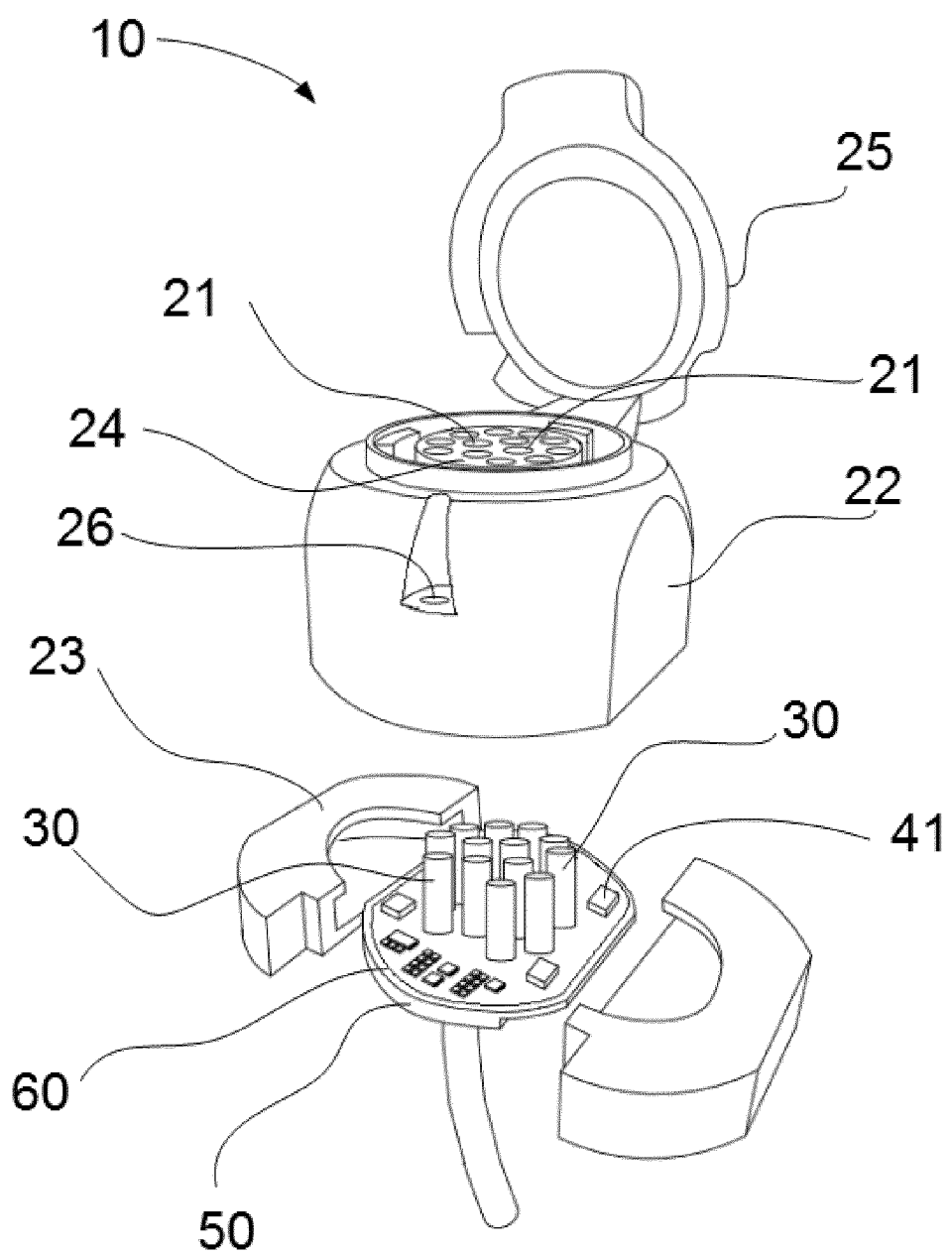
FIG. 1 schematically illustrates an exploded view of an example of an electrical socket.

FIG. 1 schematically illustrates an exploded view of an example of an electrical socket 10. The electrical socket 10 comprises a plurality of electrical connectors 30 and a plurality of guides 21 for receiving pins from the electrical plug to connect to the electrical connectors 30. The socket may further comprise a light source in the form of a LED 41, a control unit in the form of printed circuit board 50 and a proximity sensor 60.

The socket 10 may comprise a housing 22 having a substantially cylindrical shape with two ends, wherein one of its ends may comprises a plurality of guides 21 and the other one a base 23 which closes the socket 10. The base 23 may be formed by a single piece or by several pieces. The base 23 may be attached to the housing 22 for example by pressure or by bonding. Alternatively, the base may be formed integrally with the housing 22. The plurality of guides 21 for receiving pins from an electrical plug may be arranged on a front plate 24.

In the example of FIG. 1, the socket 10 further comprises a hinged lid 25 for closing the socket 10. In such a way, the electrical connector may be isolated from environmental factors such as rain, humidity or temperature.

In addition, the socket 10 may also comprise holes 26, in this example in the form of metallic threaded holes, adapted to receive threaded fasteners (not shown) for screwing the socket to a vehicle or a tow hitch, directly or through a bracket.

In this example, a plurality of electrical connectors 30 is arranged inside the socket. The plurality of electrical connectors 30 may comprise for example 13 pins or 7 pins. In this way, the plurality of guides 21 guides the pins of a plug (not shown) to contact the electrical connectors 30 of the socket 10.

In the example of the FIG. 1, the control unit is a printed circuit board (PCB). In this way, the electrical connector 30 may be mounted on the printed circuit board 50. In some examples, the printed circuit board 50 may be mounted on the base 23. Alternatively, the PCB 50 may be mounted partially embedded on the base 23.

The light source may be arranged inside the housing of the socket. Optionally, the light source may be supported by the base 23 or by the PCB 50. Alternatively, the light source may be attached to the internal side of the housing 22. In this way, the socket may further comprise translucent or semitranslucent areas (not shown). Such translucent or semitranslucent areas allow the light to be visible from outside the socket when the light source is arranged inside the socket. In some examples, only the areas of the socket surrounding the light source may be translucent or semitranslucent. In other examples, the whole housing 22 of the socket may be translucent. Alternatively, the whole socket may be translucent or semitranslucent.

In this example, the light source is in the form of a light-emitting diode (LED) 41. In some examples, three or four LED's may be arranged inside the housing of the socket, optionally relatively closed along a perimeter of the socket. In this way, the lid 25 does not need to be transparent and the light may be seen even if the lid is closed. In some cases, the socket 10 may further comprise a battery system (not shown) for powering the light source.

In other examples, the light source may be attached to the external side of the housing 22.

According to the example of the FIG. 1, the proximity sensor 60 is a capacitive sensor. The proximity sensor 60 may comprise an antenna (not shown) which may be embedded in the PCB. The antenna may be embedded along a perimeter of the PCB for increasing the area to be sensed. The antenna may be placed approximately in the central part of the housing 22 along its longitudinal axis. Alternatively, the capacitive sensor may be attached along a perimeter of an inside of the socket, i.e. inside of the housing.

In some examples, the control unit may additionally be configured to control the illumination from the light source. In this aspect, the control unit may comprise a timer configured to switch off automatically the light source after a predetermined period of time, e.g. 30 seconds, or one or two minutes. In addition, the control unit may be further configured to determine an erroneous detection as for example if after this predetermined period of time the sensor is still detecting an object, the LED's will be switched off until the sensor does not detect the object again. In this way, energy consumption may be reduced and a discharge of a battery may be avoided.

In some examples, the control unit may be further configured to control the transmission of the signals from the towing vehicle to the trailer.

In some examples, the socket may also be configured to provide additional functions as for example, modifying the light intensity by touching the socket when the light is switched on or by switching off the light by touching the socket for a period of time, e.g. ten seconds.

FIG. 2 and FIG. 3 show respectively a lateral and a frontal view of an example of an electrical socket 10. In these figures, a lid is not illustrated for clarity purposes; however the socket may comprise a lid. FIGS. 2 and 3 illustrate a socket comprising a substantially cylindrical housing 22 and a plurality of guides 21 arranged on a front plate 24. Such guides 21 allow the insertion of the pins of the plug while guiding and retaining the electrical connectors 30 of the socket in a correct position, in such a way that when the pins of a plug are inserted into the guides, the pins of the plug contact the electrical connectors 30 of the socket. In these examples, the socket may also comprise threaded holes 26 adapted to receive threaded fasteners (not shown) for screwing the socket to a vehicle or a tow hitch, directly or through a bracket.

Figure 4:
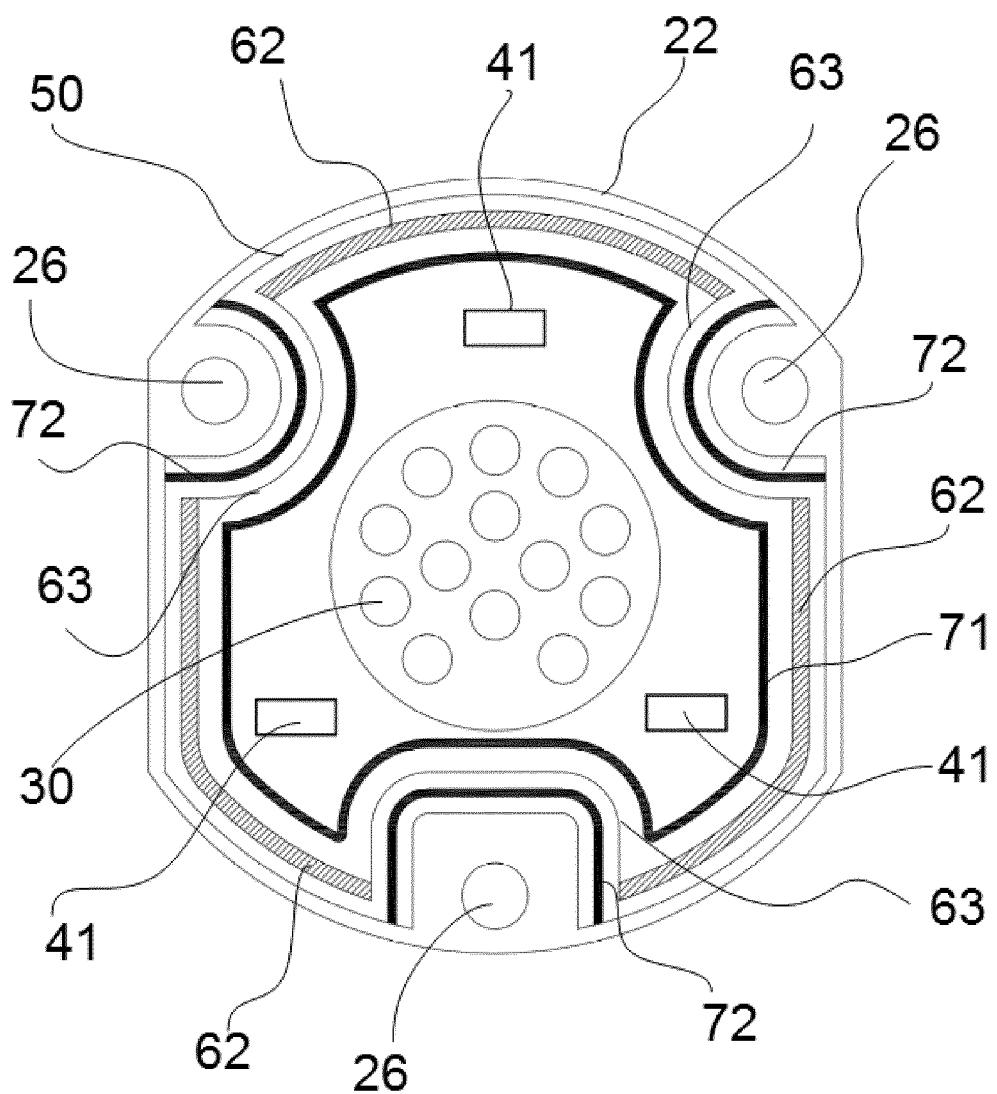
FIG. 4 schematically illustrates a cross-section view along the plane A-A' and shows a top view of a printed circuit board.

FIG. 4 schematically illustrates a cross-section view along the plane A-A' of the FIG. 2 and shows a top view of a printed circuit board 50. In the example of FIG. 4, a printed circuit board 50 is arranged inside the socket and supported by the base. In some examples, at least one LED 41 may be mounted on the printed circuit board 50. Alternatively, LED's 41 may be arranged on the housing or on the base. For clarity purposes, electronical elements of the circuit board are not shown in FIG. 4.

In some examples the capacitive antenna may be made by an electrically conductive material and may be configured as a flat electrode or flat antenna.

In the example of FIG. 4, the socket 10 comprises a capacitive sensor mounted embedded on the printed circuit board 50. The capacitive sensor may comprise a capacitive antenna or electrode. In some examples, the capacitive antenna may be arranged along a perimeter of the printed circuit board 50. In this way, the capacitive antenna may be arranged along a perimeter of the socket. Such a location increases the sensitivity and the area of detection of the capacitive sensor.

A printed circuit board 50 may comprise a top layer, i.e. the side facing the plurality of guides 21 for receiving pins, and a bottom layer, i.e. facing a base 23 of the socket. In some examples, the printed circuit layer may further comprise intermediate layers arranged between the upper and the lower layer.

FIG. 4 shows a top layer of a printed circuit layer 50. The capacitive antenna illustrated in the FIG. 4 comprises at least two strings 62 and interconnection tracks 63 connecting the strings 62. These strings 62 are wider than the interconnection tracks 63, and therefore the sensing capacity of the strings 62 is higher than of the interconnection tracks 63. The interconnection tracks 63 may only act as a connector connecting the strings 62 and may not have a sensing capacity.

In the example of FIG. 4, the interconnection tracks 63 are arranged partially surrounding the holes 26. In this way, the sensing interferences created by the metal of the threaded hole 26 or by the fastener (not shown) inserted into the hole may be reduced, since the strings are not arranged around the holes 26. In some examples, the antenna may be placed at the perimeter of the circuit board 50 and may comprise strings 62 and at least one interconnection track 63 arranged partially surrounding the holes 26 in such a way that the interconnection track is positioned inwardly with respect to the hole. In some examples, the socket may comprise three holes 26 and the capacitive antenna may comprise three strings 62 arranged between these holes 26 and three interconnection tracks 63 partially surrounding these holes. Alternatively, if the socket comprises four holes 26, the capacitive antenna may thus comprise four strings 62 and four interconnection tracks 63.

In a similar way, the bottom layer of the printed circuit board (not shown) may also comprise at least one string of a capacitive sensor. In some examples, the disturbance produced by the hole on the capacitive sensor arranged on the bottom layer may be negligible, since the bottom layer is positioned farther than the layer with respect to the hole. In these examples, the string of the bottom layer may be arranged along a perimeter of the printed circuit board 50. Alternatively, at least two strings arranged on the bottom layer may be connected by interconnection tracks.

In some examples, when the top and the bottom layer comprise several strings 62, electrical vias (not shown) may be formed by punching or lasering the printed circuit board 50, for connecting the strings arranged on the top layer to the strings arranged on the bottom layer.

In some examples, the printed circuit board 50 may comprise a conductive shield for isolating the capacitive antenna. Such a conductive shield may comprise an internal shield 71 and an external shield 72.

The internal shield 71 may be arranged internally with respect to the capacitive antenna, i.e. closer to the centre of socket, in such a way that the internal shield 71 insulates the capacitive antenna from potential internal disturbances derived for instance from the electrical connectors 30, and from the components of printed circuit board (not shown). The internal shield 71 may arranged continuously parallel to the capacitive antenna.

The external shield 72 may be arranged externally with respect to capacitive antenna, i.e. the capacitive antenna is closer to the centre of the socket than the external shield 72. In this way, the external shield 72 may isolate the capacitive antenna from disturbances located outwardly with respect to the capacitive antenna as for instance the holes 26 of the socket or the fasteners inserted into them. The external shield 72 is not continuously arranged along the whole perimeter of the board 50. The external shield 72 may only be arranged partially surrounding the holes 26 of the socket to avoid the disturbances of the holes and/or of the fasteners.

In some examples, the capacitive shield may be mounted embedded in the printed circuit board 50. In this way, the capacitive shield may be mounted embedded in the top layer of the printed circuit board 50. Additionally, the capacitive shield may be mounted along the whole depth of the printed circuit board 50.

In configurations where the interconnection tracks 63 are arranged only on the top layer of the printed circuit board 50, the internal shield 71 may be arranged along the whole depth of the printed circuit board 50, i.e. on the top layer and on the intermediate(s) layer(s) and on the bottom layer. In these examples, the disturbance produced by the hole may be negligible. Therefore, the external shield 72 may only be arranged on the top layer, i.e. surrounding the interconnection tracks 63. In this way, the length of the shield may be optimized. In other examples, both the internal shield 71 and the external shield 72 may be arranged along the whole depth, i.e. arranged on the top layer and on the intermediate(s) layer(s) and on the bottom layer.

Alternatively or additionally, the capacitive shield may be placed on the housing 22 or surrounding the electrical connector 30.

In some examples, the socket 10 may comprise a printed circuit board 50 wherein a capacitive sensor and capacitive shield are embedded. The socket may comprise a number of holes 26. The capacitive sensor may comprise strings 62 and interconnection tracks 63, wherein the interconnection tracks 63 may be placed partially surrounding the holes 26. The capacitive shield may comprise an internal shield 71 and an external shield 72. The internal shield 71 may be placed inwardly with respect to the sensor. The internal shield 71 may be placed along the whole sensor or only in those areas where the strings 62 are mounted. The external shield 72 may be placed surrounding the holes 26 between the interconnection tracks 63 and the holes 26. In this way, the effect of the holes 26 and of the fasteners to be inserted is avoided, since sensing capacity of the interconnection tracks is very low and the external shield further insulates the interconnection track from the metal of the hole. Consequently, the detection of a movement of an user intending to find the socket is more precise.

In a further aspect, a method of installing an electrical socket in a towing vehicle according to any of the examples herein described is provided. The method comprises providing an electrical socket according to any of the examples disclosed herein, attaching the socket to the towing vehicle, directly or through a bracket, and connecting the socket to the electrical system of a towing vehicle. In addition, attaching the socket to the towing vehicle may further comprise inserting at least one threaded fastener into the at least one hole.

In yet a further aspect, the present disclosure provides a method of retrofitting a tow hitch comprising an electrical socket. The method comprises disconnecting the socket from the electrical system of a towing vehicle and releasing the socket from the towing vehicle. The method further comprises providing an electrical socket according to any of the examples disclosed herein, attaching the socket to the towing vehicle and connecting the socket to the electrical system of a towing vehicle. In addition, attaching the socket to the towing vehicle may further comprise inserting at least one threaded fastener into the at least one hole.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

The invention claimed is:

1. An electrical socket for connecting an electrical installation of a towing vehicle with an electrical installation of a trailer, the electrical socket comprising:
a plurality of electrical connectors;
a plurality of guides for receiving pins from an electrical plug to connect to the electrical connectors;
one or more light sources;
a proximity sensor;
and a control unit for activating the one or more light sources in response to the proximity sensor detecting a presence of a user at a distance around the socket below a predetermined threshold distance;
wherein the proximity sensor is a capacitive sensor comprising a capacitive antenna arranged along at least a portion of a perimeter of the socket.

2. The socket according to claim 1, wherein the socket further comprises a capacitive shield for isolating the capacitive antenna.

3. The socket according to claim 2, wherein the capacitive antenna comprises at least two strings and an interconnection track connecting the strings.

4. The socket according to claim 1, wherein the socket further comprises at least one hole configured to receive a fastener for attaching the socket to the towing vehicle.

5. The socket according to claim 4, wherein the capacitive antenna comprises at least two strings and an interconnection track connecting the strings and wherein the interconnection track is arranged partially surrounding the at least one hole.

6. The socket according to claim 5, wherein the capacitive shield comprises an internal shielding for isolating the capacitive antenna from the electrical connector and an external shielding for isolating the capacitive antenna from the at least one hole.

7. The socket according to claim 1, wherein the control unit is a printed circuit board (PCB).

8. The socket according to claim 7, wherein the antenna is mounted embedded on the printed circuit board (PCB).

9. The socket according to claim 1, wherein the socket further comprises a housing and wherein the light source is arranged inside the housing.

10. The socket according to claim 9, wherein the light source is arranged on the control unit.

11. The socket according to claim 1, wherein the light source is a light emitting diode (LED).

12. The socket according to claim 1, wherein the socket further comprises a housing and wherein the proximity sensor is arranged inside the housing.

13. The socket according to claim 1, wherein the socket further comprises a housing having translucent or semitranslucent areas and wherein the light source is arranged inside the housing.

14. The socket according to claim 1, wherein the socket comprises a lid for closing the socket and the capacitive antenna is arranged on the lid.

15. An electrical socket for connecting an electrical installation of a towing vehicle with an electrical installation of a trailer, the electrical socket comprising:
a plurality of electrical connectors;
a plurality of guides for receiving pins from an electrical plug to connect to the electrical connectors;
a lid for closing the socket;
one or more light sources;
a proximity sensor;
and a control unit for activating the one or more light sources in response to the proximity sensor detecting a presence of a user at a distance around the socket below a predetermined threshold distance;
wherein the proximity sensor is a capacitive sensor comprising a capacitive antenna arranged at the lid.

16. The socket according to claim 15, wherein the control unit is a printed circuit board (PCB).

17. The socket according to claim 16, wherein the antenna is mounted embedded on the printed circuit board (PCB).

18. The socket according to claim 15, wherein the capacitive antenna arranged along at least a portion of a perimeter of the lid.

19. An electrical kit for connecting an electrical installation of a towing vehicle with an electrical installation of a trailer, the electrical kit comprising:
- an electrical socket according to claim 1;
- an electrical plug configured to be connected to the electrical socket;
- a first electrical wiring configured to connect an electrical system of a towing vehicle to the electrical socket;
- a second electrical wiring configured to connect an electrical system of a trailer to the electrical plug.

20. The electrical kit according to claim 19, wherein the kit further comprises at least one fastener configured to be inserted into the at least one hole of the socket for attaching the socket to a towing vehicle or to a bracket attached to a towing vehicle.

* * * * *